United States Patent [19]

Larbig

[11] 4,190,510

[45] Feb. 26, 1980

[54] PROCESS FOR THE ELECTROPHORETIC BREAKING OF EMULSIONS

[75] Inventor: Wolfgang Larbig, Krefeld, Fed. Rep. of Germany

[73] Assignee: Bayer Aktiengesellschaft, Leverkusen, Fed. Rep. of Germany

[21] Appl. No.: 10,287

[22] Filed: Feb. 7, 1979

[30] Foreign Application Priority Data

Feb. 25, 1978 [DE] Fed. Rep. of Germany ....... 2808225

[51] Int. Cl.² .................................................. B03C 5/00
[52] U.S. Cl. ................................ 204/180 R; 204/184; 204/185
[58] Field of Search ................ 204/180 R, 184, 185, 204/186, 190

[56] References Cited

U.S. PATENT DOCUMENTS

| | | | |
|---|---|---|---|
| 3,304,251 | 2/1967 | Walker et al. | 204/184 |
| 3,412,002 | 11/1968 | Hubby | 204/180 R |
| 4,098,673 | 7/1978 | Zucker | 204/180 R X |

*Primary Examiner*—Arthur C. Prescott
*Attorney, Agent, or Firm*—Sprung, Felfe, Horn, Lynch & Kramer

[57] ABSTRACT

A process for the electrophoretic breaking of electrically conductive emulsions of electrical conductivity greater than 2,000 $\mu$Mhos is described which process comprises adjusting the conductivity of the emulsion so that it is in the range of 0.1 to 2,000 $\mu$Mhos by increasing the degree of dispersion and thereafter passing through the emulsion a constant-voltage field of 100 to 1,000 volts.

9 Claims, No Drawings

PROCESS FOR THE ELECTROPHORETIC BREAKING OF EMULSIONS

The invention relates to a process for the electrophoretic breaking of electrically conductive emulsions which is characterised in that, in the case of emulsions with an electrical conductivity greater than 2,000 μMhos, the conductivity is adjusted to values in the range from about 0.1 to about 2,000 μMhos by increasing the degree of dispersion, and the emulsions are then broken by passing through a constant-voltage field of about 100 to about 1,000 volts.

Examples which may be mentioned of emulsions which can be broken by the process according to the invention are: emulsions consisting of about 3 to 7 parts by volume of nitrobenzene and about 1 to 3 parts by volume of 1 to 80% strength by weight waste sulphuric acid, such as is obtained during a nitration process. Further examples which may be mentioned are: emulsions of about 40 to 60% strength by weight phosphoric acid and nitrobenzene in a ratio of about 1:9 to 2:3 (weight volume), or 40 to 60% strength by weight phosphoric acid and 2-ethylhexanol in a ratio of about 1:9 to 2:3 (weight volume), or 5 to 20% strength by weight sodium hydroxide solution and 2-ethylhexanol in a ratio of about 1:9 to 2:3 (weight volume).

The waste sulphuric acid obtained during the nitration of benzene to give nitrobenzene consists of sulphuric acid to the extent of 60–80% by weight, the remainder being water.

Since emulsions having an electrical conductivity outside the abovementioned conductivity range are obtained during numerous washing and cleaning processes as well as during chemical production processes, it is necessary, in order to break the emulsions effectively in a constant-voltage field, to adjust the electrical conductivity of the emulsions to values in the range from about 0.1 to about 2,000 μMhos, preferably 1 to 1,000 μMhos and particularly preferably 5 to 500 μMhos.

If the electrical conductivity of the emulsions is too high, there is, in fact, the danger that a constant-voltage field of about 100 to 1,000 volts necessary for electrophoretic breaking cannot be built up, and the electrophoretic breaking changes into electrolysis.

If emulsions with an electrical conductivity from the beginning in the range from about 0.1 to about 2,000 μMhos are obtained during washing and cleaning processes, these emulsions can be broken directly, without further treatment, by passing through a constant-voltage field of about 100 to about 1,000 volts.

In order to be able to extend electrophoretic breaking of electrically conductive emulsions also to electrical conductivities in high ranges, for example up to 100,000 μMhos, it was necessary to discover methods which enable the electrical conductivity of the emulsions to be reduced.

It has been found that in the case of emulsions with electrical conductivities greater than 2,000 μMhos, the conductivity can be reduced by increasing the degree of dispersion of the emulsions.

Increasing the degree of dispersion is effected with customary physical-mechanical dispersion methods, such as stirring, circulatory pumping, ultrasound and the like. This process is sometimes accelerated by adding emulsifiers, such as sodium lauryl-sulphate, sulphonated castor oils which have been rendered neutral and sulphonated higher alcohols which have been rendered neutral.

The amount of emulsifiers to be added is not critical. It depends, inter alia, on the composition of the emulsions and can appropriately be determined by preliminary experiments.

In general, the emulsions are subjected to a dispersing process until the electrical conductivity has been adjusted to within the abovementioned conductivity range. The treatment period depends, above all, on the nature of the composition of the emulsion and can appropriately be determined beforehand.

The process according to the invention can be carried out at all temperatures in the range in which emulsions are formed.

The process according to the invention can be carried out as follows: An emulsion which consists, for example, of 3 parts by volume of nitrobenzene and 2 parts by volume of 70% strength by weight waste sulphuric acid, such as is obtained, for example, during the nitration of benzene in the presence of sulphuric acid, and has an electrical conductivity of 10,000 to 20,000 μMhos is brought to an electrical conductivity of about 300 to 400 μMhos by stirring or circulatory pumping with a high-speed pump (1,500 to 2,500 revolutions per minute), and then flows through, for example, a tubular electrode chamber. The emulsion thereby passes through a constant-voltage field of about 100 to 1,000 volts, preferably 300 to 500 volts. The current is about 0.5 to 1 ampere. Steady flooding of the electrode chamber is ensured by simple regulation of the flow of emulsion, so that even if any electrical flashovers occur between the electrodes, there is no danger of ignition of any ignitable gas mixtures in the electrode chamber. After a residence time of about 5 to about 30 minutes in a separation tank, the separated phases of nitrobenzene and 70% strength by weight waste sulphuric acid can be removed from the tank.

Compared with other processes for breaking emulsions, the process according to the invention is distinguished by the following advantages:

The process according to the invention is virtually maintenance-free and free from mechanical wear. This makes the process particularly economical. There is no restriction on the amount of emulsion to be passed through per hour. The process can be applied in areas where there is an explosion hazard and is not sensitive to fine or coarse impurities in the emulsions. The separation effect is high and, apart from the actual solubility of the components in one another, the constituents are obtained in a pure form. Since the electrophoretic breaking of emulsions already takes place extremely rapidly in very small electrode chambers, the space/time yield is particularly high.

The examples which follow serve to illustrate the process according to the invention.

EXAMPLE 1

An emulsion of 3 parts by volume of crude nitrobenzene and 2 parts by volume of 70% strength by weight waste sulphuric acid, consisting of 70% by weight of sulphuric acid and 30% by weight of water, was pumped, at 50° C., round in a simple circulatory apparatus consisting of a receiver with a stirrer and circulation pump, an electrophoresis cell and a separation tank. After the conductivity has fallen from about 15,000 μMhos to 400 μMhos, the emulsion could be broken in the electrophoresis cell by applying a constant-voltage of 300 volts at 0.6 to 0.8 ampere. The nitrobenzene discharged from the separation tank after a residence time of 20 minutes had a residual acid content of 0.3% by weight. The acid content in the case of other separation processes, for example passing through a separator or coaleser, is 0.6 to 0.8% by weight.

EXAMPLE 2

The tables below show the decrease in the electrical conductivity of emulsions consisting of various components. The experiments on which the results are based were carried out as follows:

The components were stirred at 700 revolutions per minute in a 2 liter beaker using a twin-bladed stirrer. The degree of dispersion was thereby increased. The conductivity was measured at certain intervals of time during the stirring.

(a) 1% strength by weight waste sulphuric acid: nitrobenzene=2:3.
Temperature 23° C.
After 5 seconds: 1,499 μMhos
After 15 seconds: 968 μMhos
After 30 seconds: 158 μMhos
After 60 seconds: 37 μMhos
After 90 seconds: 26 μMhos
After 120 seconds: 26 μMhos (final value)

(b) 10% strength by weight waste sulphuric acid: nitrobenzene=2:3.
Temperature 23° C.
After 5 seconds: 1,056 μMhos
After 15 seconds: 361 μMhos
After 30 seconds: 246 μMhos
After 60 seconds: 211 μMhos
After 90 seconds: 202 μMhos
After 120 seconds: 141 μMhos
After 150 seconds: 132 μMhos
After 180 seconds: 114 μMhos (final value)

(c) 30% strength by weight waste sulphuric acid:nitrobenzene=2:3.
Temperature 23° C.
After 5 seconds: 2,816 μMhos
After 15 seconds: 1,364 μMhos
After 30 seconds: 361 μMhos
After 60 seconds: 317 μMhos
After 90 seconds: 255 μMhos
After 150 seconds: 246 μMhos
After 180 seconds: 238 μMhos (final value)

(d) 50% strength by weight waste sulphuric acid:nitrobenzene=2:3.
Temperature 23° C.
After 5 seconds: 3,872 μMhos
After 15 seconds: 1,716 μMhos
After 30 seconds: 651 μMhos
After 60 seconds: 422 μMhos
After 120 seconds: 255 μMhos
After 180 seconds: 220 μMhos (final value)

(e) 70% strength by weight waste sulphuric acid:nitrobenzene=2:3.
Temperature 23° C.
After 5 seconds: 3,344 μMhos
After 15 seconds: 2,992 μMhos
After 30 seconds: 2,552 μMhos
After 60 seconds: 1,672 μMhos
After 120 seconds: 1,144 μMhos
After 180 seconds: 924 μMhos
After 240 seconds: 748 μMhos
After 270 seconds: 638 μMhos (f) 80% strength by weight waste sulphuric acid:nitrobenzene=2:3.
Temperature 23° C.
After 5 seconds: 2,464 μMhos
After 15 seconds: 2,156 μMhos
After 90 seconds: 704 μMhos
After 150 seconds: 554 μMhos
After 270 seconds: 343 μMhos
After 360 seconds: 220 μMhos
After 480 seconds: 189 μMhos (final value)

(g) 70% strength by weight waste sulphuric acid:nitrobenzene=3:7.
Temperature 23° C.
After 5 seconds: 1,584 μMhos
After 15 seconds: 616 μMhos
After 60 seconds: 422 μMhos
After 120 seconds: 361 μMhos
After 180 seconds: 326 μMhos (final value)

(h) 70% strength by weight waste sulphuric acid: nitrobenzene=1:4.
Temperature 23° C.
After 5 seconds: 880 μMhos
After 15 seconds: 282 μMhos
After 30 seconds: 194 μMhos
After 60 seconds: 158 μMhos
After 90 seconds: 132 μMhos (final value)

(i) 40% strength by weight phosphoric acid:nitrobenzene=2:3.
Temperature 23° C.
After 5 seconds: 2,904 μMhos
After 15 seconds: 1,584 μMhos
After 30 seconds: 968 μMhos
After 60 seconds: 739 μMhos
After 150 seconds: 642 μMhos
After 300 seconds: 572 μMhos
After 360 seconds: 554 μMhos (final value)

(j) 60% strength by weight phosphoric acid:nitrobenzl=2:3.
Temperature 23° C.
After 5 seconds: 4,200 μMhos
After 15 seconds: 968 μMhos
After 30 seconds: 598 μMhos
After 60 seconds: 519 μMhos
After 120 seconds: 431 μMhos
After 180 seconds: 396 μMhos (final value)

(k) 40% strength by weight phosphoric acid:2-ethylhexanol=2:3.
Temperature 23° C.
After 5 seconds: 1,144 μMhos
After 15 seconds: 1,056 μMhos
After 30 seconds: 704 μMhos (final value)

(l) 10% strength by weight sodium hydroxide solution: 2-ethylhexanol=2:3.
Additive: "Brillantöl" emulsifier.
Temperature 23° C.
After 5 seconds: 1,816 μMhos
After 15 seconds: 1,144 μMhos
After 30 seconds: 704 μMhos
After 60 seconds: 176 μMhos
After 180 seconds: 106 μMhos
After 300 seconds: 70 μMhos (final value)

What is claimed is:

1. A process for electrophoretic breaking of electrically conductive emulsions of electrical conductivity greater than 2,000 μMhos which comprises adjusting the conductivity of said emulsion to a value in the range from 0.1 to 2,000 μMhos by increasing the dispersion of said emulsion and thereafter passing therethrough a constant-voltage field of 100 to 1,000 volts.

2. A process according to claim 1 wherein the electrical conductivity of the emulsions adjusted to be in the range of from 1 to 1,000 μMhos.

3. A process according to claim 1 wherein the electrical conductivity of the emulsion is adjusted to a value in the range of from 5 to 500 μMhos.

4. A process according to claim 1 wherein the degree of dispersion of the emulsion is increased by stirring, circulatory pumping or by the application of ultrasonic waves thereto.

5. A process according to claim 1 wherein an emulsifier is added to the emulsion to increase the degree of dispersion.

6. A process according to claim 1 wherein the emulsion comprises a mixture of crude nitrobenzene and waste sulphuric acid.

7. A process according to claim 1 wherein said emulsion comprises phosphoric acid and nitrobenzene.

8. A process according to claim 1 wherein said emulsion comprises phosphoric acid and 2-ethylhexanol.

9. A process according to claim 1 wherein said emulsion comprises sodium hydroxide and 2-ethylhexanol.

* * * * *